Dec. 12, 1967 W. C. ETHERIDGE ET AL 3,357,367
DRIVE PIN POSITION CONTROL MECHANISM FOR
FLOOR TRUCK TOW LINE SYSTEMS
Filed Nov. 28, 1962 5 Sheets-Sheet 1
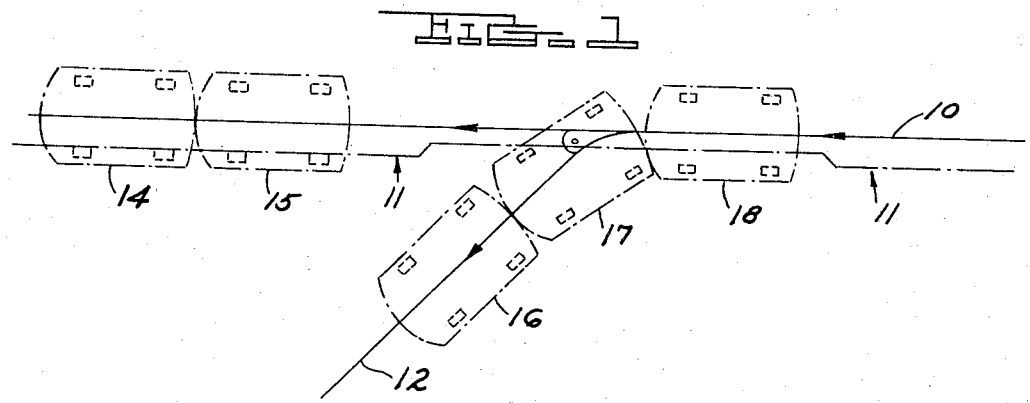
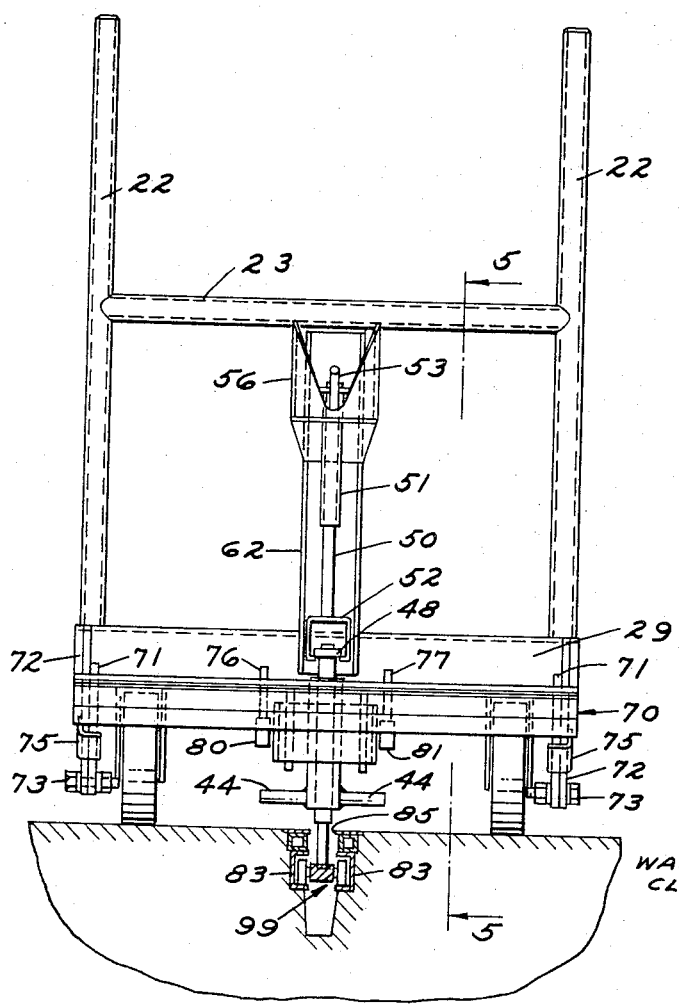
INVENTORS
WALTER C. ETHERIDGE
CLARENCE A. DEHNE
BY
Farley, Forster & Farley
ATTORNEYS

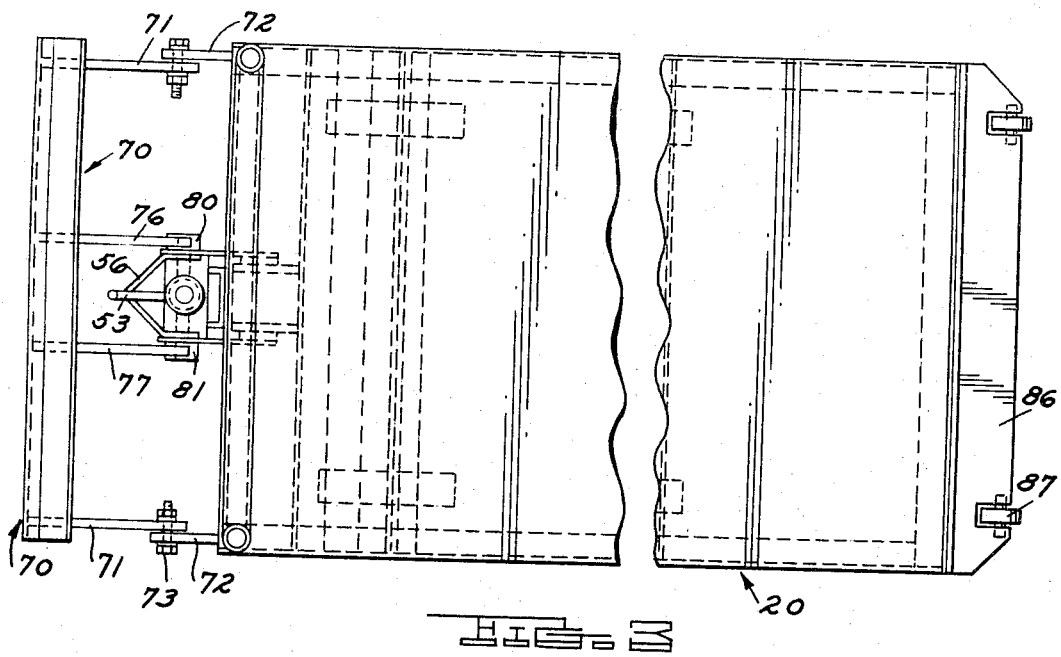
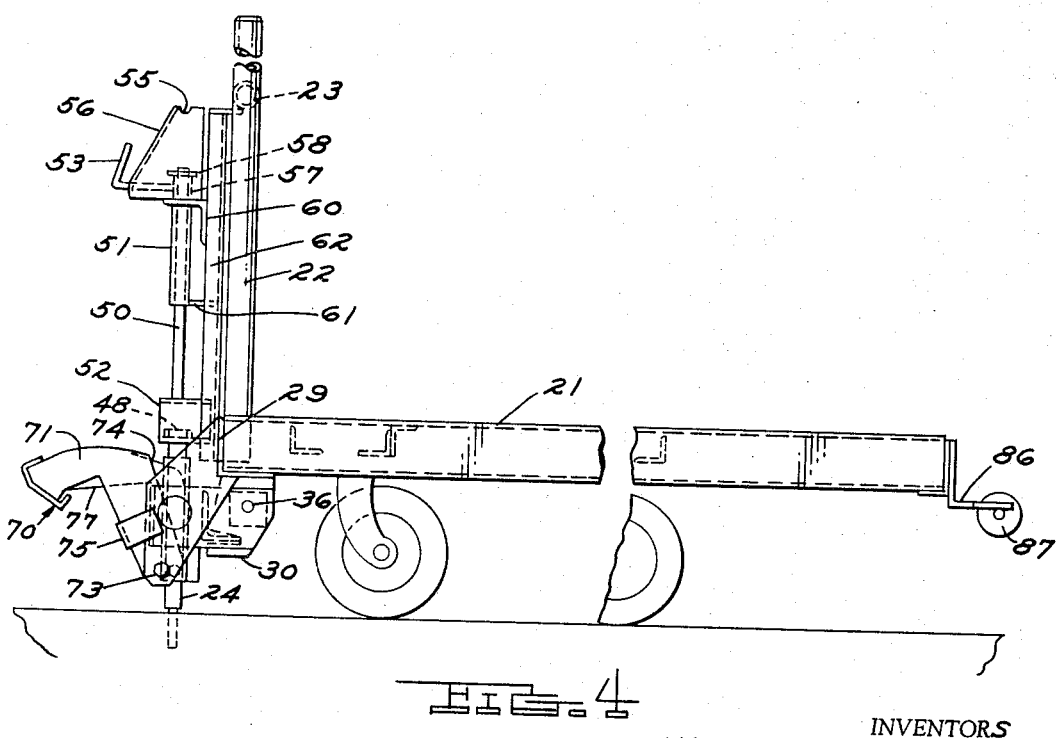

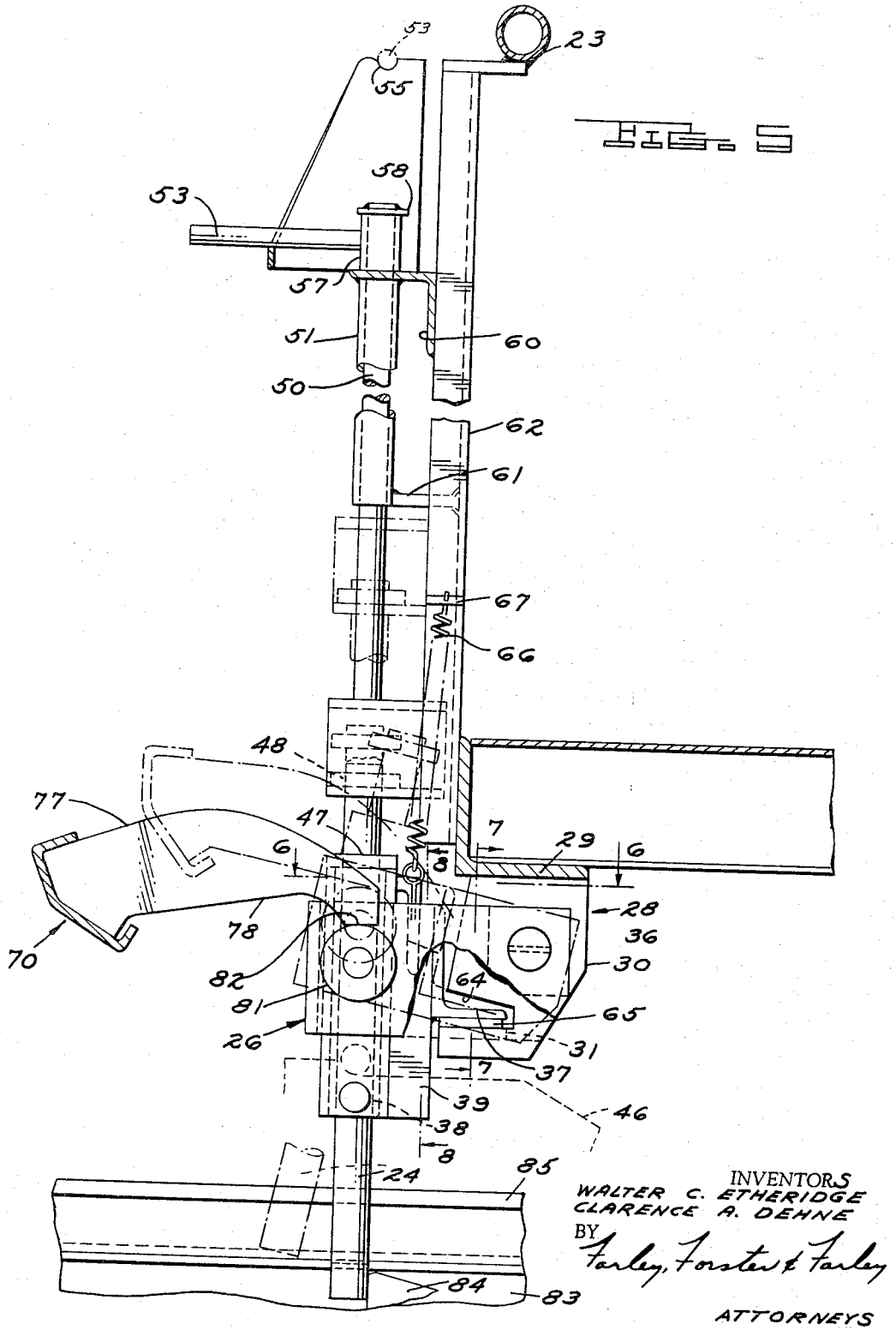

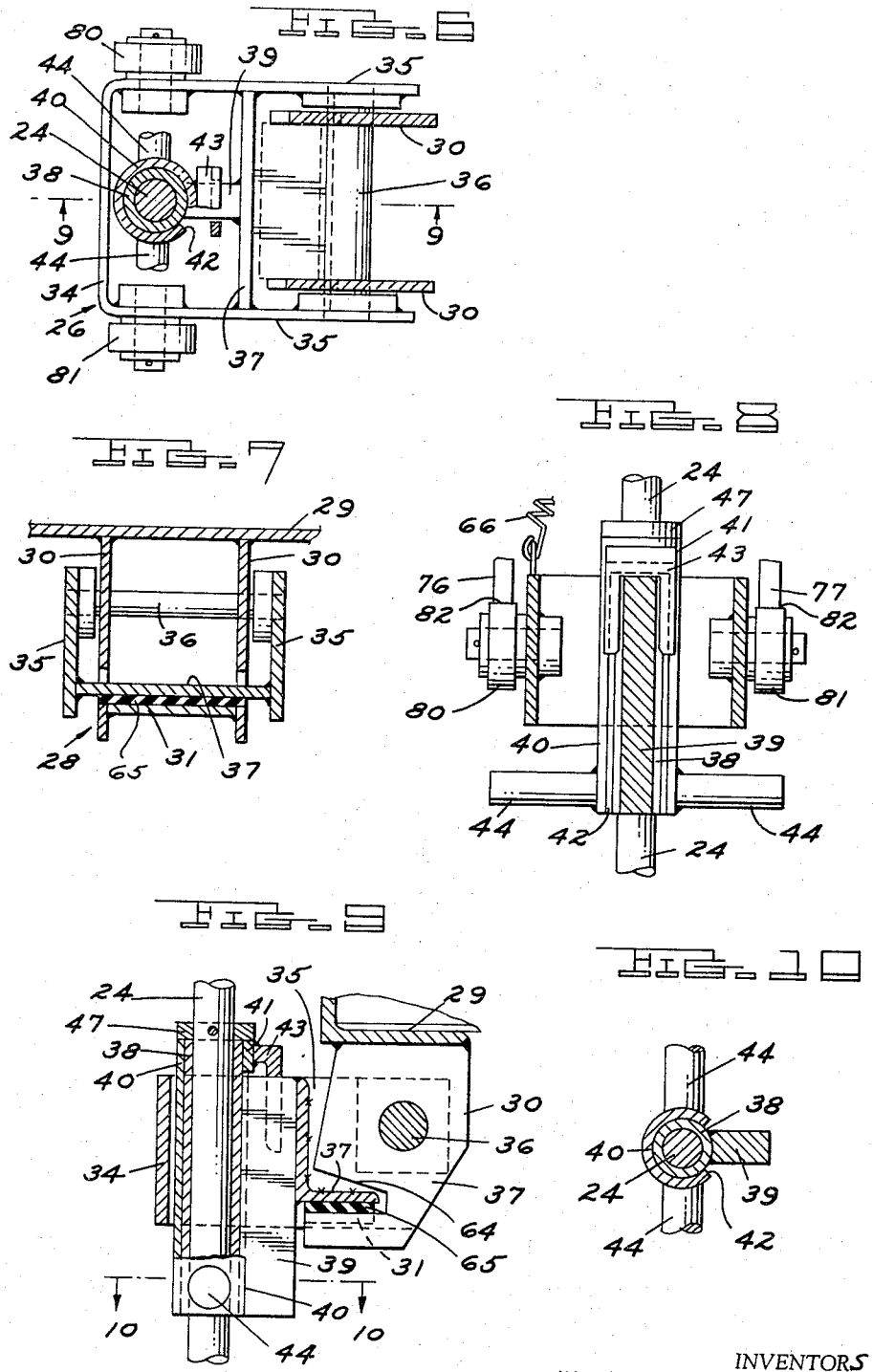

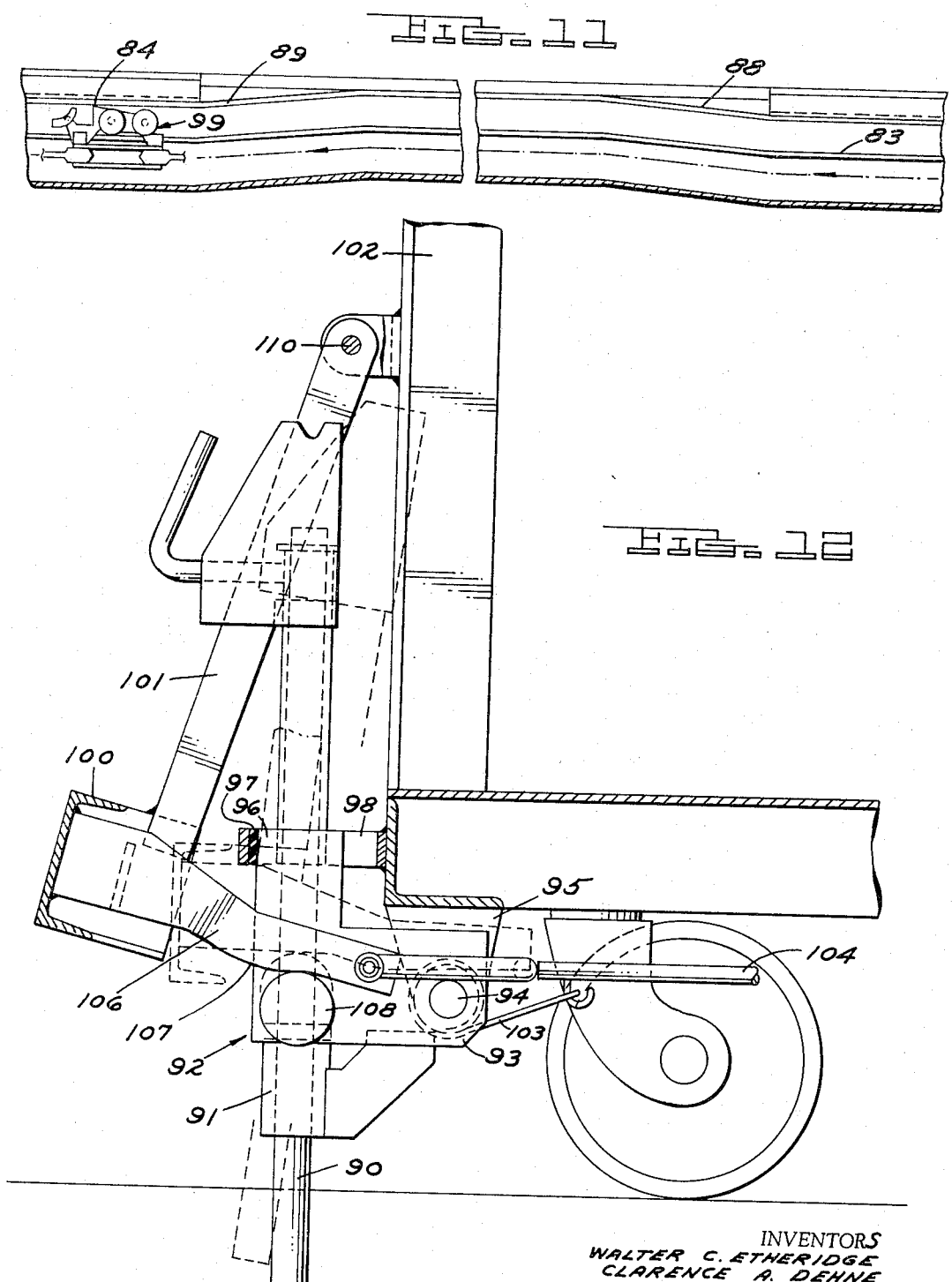

United States Patent Office 3,357,367
Patented Dec. 12, 1967

3,357,367
DRIVE PIN POSITION CONTROL MECHANISM FOR FLOOR TRUCK TOW LINE SYSTEMS
Walter C. Etheridge, Birmingham, and Clarence A. Dehne, Garden City, Mich., assignors to Jervis B. Webb Company, Detroit, Mich., a corporation of Michigan
Filed Nov. 28, 1962, Ser. No. 240,665
19 Claims. (Cl. 104—172)

This invention relates to improved mechanism for controlling the position of a floor truck drive pin in a tow line system of the type wherein floor trucks are propelled in a path defined by a guide slot by engagement between a drive pin on the floor truck and the driving member of a two line travelling beneath the guide slot.

The general object of the present invention is to provide a drive pin positioning mechanism which will permit the following features to be incorporated as required in a tow line system of the type mentioned above:

(a) Automatic accumulation of trucks at a station;
(b) Automatic disengaging of a truck drive pin in case the truck collides with an object in the path of travel; and
(c) Employing a driven truck to push a preceding truck or trucks onto a spur line at a switch zone.

Drive pin position control mechanism of the invention includes drive pin supporting means carried by the floor truck for mounting the drive pin for movement between a lower driving position in which the drive pin is engageable by a drive member of the tow line and a higher driving position in which the drive pin is ordinarily not engageable by such drive member, means normally urging the drive pin to the higher position, a bumper, means mounting the bumper on the front of the floor truck for movement between an extended position and a retracted position, and drive pin positioning means operable by movement of the bumper for holding the drive pin in the lower driving position thereof when the bumper is in its extended position and for permitting normally urged movement of the drive pin to the higher position thereof when the bumper is moved to its retracted position.

Preferably the means for supporting the drive pin on the floor truck includes a housing pivotally connected to the floor truck for movement on an axis extending transversely thereof, and cam and follower means between the supporting housing and a positioning member secured to the bumper so that the positioning member acts to retain the pin supporting housing in the lower position of the drive pin.

Preferably also the supporting housing is so pivotally connected to the floor truck that the driving reaction on the drive pin moves the drive pin supporting housing and drive pin to the higher position thereof when the bumper is moved to retracted position, thereby providing a pivoting disengaging motion of the drive pin in the direction of travel which reduces friction between the drive pin and drive member and reduces the likelihood of damage to the pin.

A spring is preferably employed to normally urge the drive pin supporting housing to the higher position thereof so that when the bumper is moved to retracted position the drive pin moves to higher position not only through driving reaction, as mentioned above, but also by the force of the spring which then acts to hold the drive pin in the higher position until the bumper returns to its extended position. Return movement of the bumper, through the cam and follower arrangement, acts to positively position the drive pin supporting housing and drive pin in the lower driving position.

For push-off switching, the invention provides a section in the tow line along which a drive member travels in reduced spaced relation to the floor truck so that the drive member is engageable with the floor truck drive pin in either the lower or the higher position thereof.

Other objects and advantages of the invention will appear from the following description of the presently preferred representative embodiments disclosed in the accompanying drawings which disclose the following views:

FIGURE 1, a schematic plan view of a portion of a tow line system;
FIGURE 2, a front elevation of a floor truck equipped with the improved drive pin position control mechanism of the invention;
FIGURE 3, a plan view of the floor truck of FIG. 2;
FIGURE 4, a side elevation of the floor truck of FIG. 2;
FIGURE 5, an enlarged sectional elevation of the drive pin position control mechanism taken as indicated by the line 5—5 of FIG. 2;
FIGURE 6, a sectional plan view on the line 6—6 of FIG. 5;
FIGURE 7, a sectional elevation on the line 7—7 of FIG. 5;
FIGURE 8, a sectional elevation on the line 8—8 of FIG. 5;
FIGURE 9, a sectional elevation on the line 9—9 of FIG. 6;
FIGURE 10, a sectional detail on the line 10—10 of FIG. 9;
FIGURE 11, a sectional elevation of the tow line taken as indicated by the line 11—11 of FIG. 1; and
FIGURE 12, an enlarged sectional elevation of an alternate form of drive pin position control mechanism.

The various types of operation which can be incorporated as desired into a tow line system by the use of the invention can perhaps be better appreciated by a brief reference to the portion of a system schematically shown in FIG. 1. A main line guide slot is indicated by the line 10 and the sub-floor tow line by the line 11. A non-powered spur line is shown at 12. An accumulation or safety operation is illustrated at the left where truck 14 has been stopped either by a wayside stop or by manual disengagement of its drive pin from the drive line. A following truck 15 has automatically been stopped by disengagement of its drive pin from the drive line in response to contact with the rear of the truck 14.

Trucks 16 and 17 have been diverted onto the spur line 12 and are being pushed by a non-diverted following truck 18. All trucks 14-18 are equipped with the drive pin position control mechanism of the invention.

Referring to FIGS. 2-5, the floor truck 20 is of conventional construction having a suitable load supporting bed 21 and a pair of vertically extending posts 22 at the front corners, interconnected by a cross-member 23. Supporting means are provided for mounting a drive pin 24 on the front of the truck for movement between a lower position, shown in full line in FIG. 5, and a higher position indicated in phantom. Supporting means for the drive pin include a housing generally designated by the reference 26 which is pivotally carried by a bracket 28 secured to the truck frame member 29. Bracket 28 is generally U-shaped (FIG. 7), having a pair of spaced downwardly extending members 30 interconnected adjacent their lower ends by a cross-member 31.

Details of the drive pin supporting means are shown in FIGS. 6-10. The drive pin housing 26 consists of a U-shaped member 34 (FIG. 6) having rearwardly extending legs 35 which are pivotally connected by a pin 36 to the bracket members 30 and which are interconnected by an angle member 37 (FIG. 9). The drive pin 24 is slidably and rotatably mounted in a sleeve 38 which is rigidly secured to the angle cross-member 37 by a bar 39 (FIGS. 6 and 9). A tube 40 is slidably mounted on the outer surface of the sleeve 38 and is provided with a notch 42 along all but its upper portion 41 for clearance with the sleeve mounting bar 39, and a downwardly extending notched tang 43 is secured to the upper tube portion 41, straddling the mounting bar 39 to prevent rotation of the tube 40 on the sleeve 38. A pair of cross-arms 44 are secured to the tube adjacent the lower end thereof and extend transversely of the truck to either side of the drive pin for engagement with a ramp shaped wayside stop 46 indicated in dashline in FIG. 5. The tube 40 normally occupies a lower position defined by engagement of its upper collar-like portion 41 with the sleeve mounting bar 39.

Drive pin 24 is provided with a pair of collars 47 and 48 adjacent its upper end and normally occupies a lower position within the sleeve 38, this position being defined by engagement between the lower collar 47 and the upper end of the sleeve 38 and tube 40. When the cross-arms 44 of the tube 40 engage the ramp of a wayside stop, the tube 40 slides upwardly on the sleeve 38, moving the drive pin upwardly with it through engagement between the upper end 41 of the tube and the lower collar 47, and when the cross arms 44 are disengaged from the wayside stop the tube 40 and drive pin 24 are free to return to their lower position by gravity.

Manual movement of the drive pin to a disengaged position is accomplished by a disengaging rod 50 (FIGS. 2, 4 and 5) slidably mounted in a tube 51 and provided at its lower end with a yoke 52 which straddles the drive pin beneath the upper collar 48 thereof, and provided at its upper end with a handle 53 which can be positioned a notch 55 of a retainer member 56. The handle is attached to a collar 57 which underlies a washer 58 secured to the upper end of the disengaging rod 50. Sleeve 51 is welded between an upper angle member 60 and lower plate 61 both of which are in turn secured to a channel shaped support 62 which is mounted between the truck frame member 29 and upper cross member 23.

The side members 30 of the supporting bracket 28 are each provided with a notch 64 (FIGS. 5 and 9) into which the angle member 37 of the housing 26 extends, thereby serving to limit pivotal movement of the housing 26 on the bracket 28 between a lower position in which the member 37 of the housing engages a pad 65 carried by the cross member 31 of the bracket 28 and an upper position in which the housing cross member 37 engages the upper surfaces of the notches; and preferably, the housing 26 is normally urged to this upper position by a spring 66 (FIG. 5) mounted between the housing and a bracket 67 on the member 62.

A bumper assembly 70 (FIGS. 2-4) includes a pair of arms 71 which are each secured pivotally to a bracket 72 at the sides of the truck. These arms 71 extend rearwardly and downwardly to their pivotal connection at 73 so that the bumper is normally urged to a forward or extended position by its own weight, and if the bumper encounters an obstacle, rearward movement on the pivots 73 is limited by the engagement of the rear face 74 (FIG. 4) of the bumper arms and the truck frame member 29. Forward movement of the bumper is limited by an angle stop 75 secured to each of the bumper support members 72.

The bumper assembly also includes drive pin positioning means (FIGS. 2-5) in the form of a pair of positioning members 76 and 77 which act to hold the drive pin and supporting housing in the lower position thereof when the bumper is in its extended position. Each positioning member 76 and 77 is provided with a cam-like lower surface 78 (FIG. 5) and the drive pin housing is provided with a pair of roller followers 80 and 81 mounted on the sides 35 of the U-shaped housing member (FIG. 6). When the bumper is in its extended position, the rollers are engaged by the terminal portions 82 of the positioning members and the drive pin housing and drive pin thereby are positively retained in their lower position because the bumper pivotal axis 73 is so located relative to the followers 80 and 81 that when the drive pin is engaged by a drive member 84 the reaction on the positioning members 76 and 77 does not have a component tending to move the bumper to its retracted position. This reaction on the drive pin however, does have a component tending to move the drive pin housing to its higher position and thus when the bumper encounters an obstacle and is moved to retracted position the rollers 80 and 81 will ride along the cam surfaces 78 of the positioning members and permit the supporting housing to pivot to the higher position shown in phantom in FIG. 5 in which the drive pin is above the path of movement of the drive member 84.

Each truck is preferably provided with a shelf-like member 86 mounted on the rear thereof so that when a moving truck encounters a preceding stopped one the bumper will ride up on the shelf member 86 and be retained thereby in retracted position even though there be some amount of rebound. Rollers 87 carried by the member 86 tend to limit rebound and scuffing.

As best shown in FIG. 5, the higher position of the housing 26 and drive pin 24 is one in which the drive pin is normally disengaged from a drive member 84 but is still well within the guide slot 85 of the tow line. Whenever it is desired to provide for positive pushing, as at the switch zone shown in FIG. 1, the tow line is provided with a section along which the drive members travel in reduced spaced relation to the floor truck so as to be engageable with the drive pin in either the lower or the higher position thereof.

Such a section is shown in FIG. 11. The tow line, according to conventional practice, includes a pair of track members 83 (FIG. 2) which support trolleys 99 equipped with drive members 84. A rise section 88 is provided in the tracks 83 in advance of the switch zone and a drop section 89 following the switch zone, the tracks 83 extending between the rise and drop sections at a level such as to engage the floor truck drive pin when in its higher position.

An alternate form of construction is illustrated somewhat schematically in FIG. 12. In this construction the drive pin 90 is again slidably supported in a sleeve 91 of a housing 92 which includes a pair of arms 93 pivotally connected at 94 to supporting brackets 95 for movement on an axis transverse to the truck between a lower position, defined by engagement between an upper portion 96 of the housing and a pad 97 secured to a collar 98, and a higher position.

A bumper 100 is pivotally carried by a pair of upwardly extending arms 101 secured to the front super structure 102 of the truck for movement on a transverse axis between a normal extended position shown in full line and a retracted position shown in phantom. Movement to extended position is obtained by a spring 103 secured to a brake actuating rod 104 which in turn is secured to drive pin positioning arms 106. The positioning arms 106 are again provided with cam surfaces 107 for engaging roller followers 108 secured to the housing 92 and the action is essentially the same as that previously described—when the bumper encounters an obstacle and is moved to retracted position the cam surfaces 107 of the positioning arms 106 permit the roller followers 108, the housing 92 and drive pin 90 to move to the higher position shown in dash line.

When the bumper is in extended position the reaction force transmitted to the positioning arms 106 from the rollers 108 does not have a component tending to pivot the bumper to retracted position. This is obtained by placing the bumper pivot 110 either on the line of force between the rollers 108 and cam surfaces 107 or to the rear thereof as shown in FIG. 12, so that the force transmitted to the bumper either includes no component of pivotal motion or one tending to move the bumper to extended position. In other words, when the bumper is in extended position the drive pin housing is positively locked in its lower position.

The drive pin position control mechanism of the invention is of relatively simple construction and provides for desired drive pin positioning under practically all conditions encountered in floor truck tow line operation—safety stopping, accumulation, positive pushing and fully retracted off the line movement. A pivotal rather than a straight line pin disengaging motion is provided for safety stopping and accumulation conditions and when the bumper is released from retracted position, the pin is positively moved to its lower driving position by return movement of the bumper.

Other features and advantages of the construction will be readily apparent to those skilled in the art as will modifications from the preferred representative embodiments of the invention described in detail. Such modifications as are within the scope of the following claims are to be considered a part of the invention.

We claim:

1. Mechanism for controlling the relative position between the drive pin of a floor truck and the drive member of a tow line comprising drive pin supporting means carried by the floor truck for mounting the drive pin for movement between a lower driving position in which the drive pin is engageable by a drive member and a higher driving position in which the drive pin is ordinarily not engageable by a drive member, means urging the drive pin to said higher position, a bumper, means mounting the bumper on the front of the truck for movement between an extended position and a retracted position, and drive pin positioning means operable by movement of the bumper for holding the drive pin in the lower normal driving position thereof when the bumper is in its extended position and for permitting normally urged movement of the drive pin to the higher position thereof when the bumper is moved to its retracted position.

2. Drive pin position control mechanism according to claim 1 wherein the drive pin supporting means includes a supporting housing, pivot means for connecting the supporting housing to the floor truck for pivotal movement on an axis extending transversely of the floor truck, said drive pin positioning means including a positioning member carried by the bumper and cam and follower means between the positioning member and the drive pin supporting housing.

3. Drive pin position control mechanism according to claim 2 wherein the said pivot means for connecting the supporting housing to the floor truck is located relative to the drive pin so that the driving reaction on the drive pin from the drive member of the tow line has a component tending to move the drive pin supporting housing and drive pin to the said higher position thereof.

4. Drive pin position control mechanism according to claim 2 wherein the means mounting the bumper on the truck includes a pivotal connection therebetween on an axis transverse to the truck, said pivotal axis of the bumper being located relative to the cam and follower so that the reaction transmitted to the bumper through the drive pin positioning member does not have a component tending to move the bumper to retracted position when the drive pin is in its lower position and engaged by a drive member of the tow line.

5. Drive pin position control mechanism according to claim 1 wherein the said means normally urging the drive pin to said higher position comprises a spring.

6. Floor truck drive pin position control mechanism according to claim 1 wherein the means mounting the bumper on the truck includes a pivotal connection therebetween on an axis transverse to the truck, said drive pin positioning means including a cam carried by the bumper and follower means between the drive pin and the cam.

7. In a floor truck drive line system including a main line guide slot, propelling means including a drive member travelling therebeneath for engagement with a floor truck drive pin lowered into the guide slot, a branch line guide slot, and a switch zone having means for transferring a floor truck drive pin from main to branch line guide slots, means for controlling driving engagement between a floor truck drive pin and a drive member whereby the drive pin of a floor truck will be disengaged from a drive member in response to contact between the floor truck and an object in the path of floor truck travel and will not be disengaged from the drive member in response to contact between a following truck and an immediately preceding truck at the switch zone so that the following truck can push the preceding truck onto the branch line guide slot, said controlling means including means mounting a floor truck drive pin for movement between a low driving and a high driving position, actuating means for moving said drive pin from low driving to high driving position in response to contact between said floor truck and an object in the path of floor truck travel, track means supporting the propelling means and drive member for normal travel at a level such that the drive member is engageable with the floor truck drive pin only in the low driving position thereof, a rise section in said track means in advance of said switch zone and a drop section in said track means following said switch zone, said track means extending between the rise and drop sections at a level such that a drive member can engage a floor truck drive pin when in the high driving position thereof.

8. Mechanism for controlling the relative position between the drive pin of a floor truck and the driving member of a tow line comprising a drive pin supporting housing, means mounting the drive pin thereon, pivot means for connecting said supporting housing to the floor truck for movement on an axis transverse thereof between a lower driving position and a raised position of the drive pin, a bumper, means for pivotally connecting the bumper to the floor truck for movement on an axis transverse thereto between a normal extending position and a retracted position, a drive pin positioning member carried by the bumper and cam and follower means between said positioning member and drive pin supporting housing, said bumper pivot means being located relative to the cam and follower so that the reaction force between said drive pin housing and positioning member does not produce a component tending to move the bumper to retracted position when the drive pin is in its lower normal driving position and engaged by said tow line driving member.

9. Drive pin position control mechanism according to claim 8 further characterized by means normally urging said supporting housing to the raised position thereof.

10. Drive pin position control mechanism according to claim 8 wherein the means mounting the drive pin on the drive pin supporting housing comprises a sleeve carried by said housing, the drive pin being slidably mounted in said sleeve, and means for limiting downward movement of the drive pin in said sleeve.

11. Drive pin position control mechanism according to claim 10 further characterized by the drive pin including an upper portion which projects above said sleeve, a drive pin disengaging rod slidably carried on the front of the truck for vertical movement, and means connecting the upper portion of the drive pin to the lower portion of said drive pin disengaging rod.

12. Drive pin position control mechanism according to claim 10 further characterized by means for moving the drive pin upwardly in said sleeve to a position of disengagement from the drive line in response to the arrival of the floor truck at a wayside stop comprising a member slidably carried on the outer surface of said sleeve, said member being provided with wayside stop engaging means, and means for preventing rotary movement of said member on said sleeve.

13. Drive pin position control mechanism according to claim 12 further characterized by means for moving the drive pin to a disengaged position from the drive line independently of movement by either said supporting housing or said wayside stop.

14. Drive pin position control mechanism according to claim 9 wherein the said means for mounting the drive pin on said drive pin supporting housing comprises a sleeve in which the drive pin is rotatably and slidably carried, a mounting bar secured to said sleeve on a minor portion of the circumference thereof and secured to said housing, a tubular member slidably engaging the outer surface of said sleeve, said tubular member including a slotted portion for clearance with said mounting bar, wayside stop engaging means carried by said tubular member for moving said tubular member vertically in response to engagement with a wayside stop, said driving pin including a collar overlying said sleeve and tubular member whereby said collar acts to define the lower position of said drive pin by engagement with said sleeve and acts to raise said drive pin in response to disengaging movement of said tubular member.

15. Mechanism for controlling the relative position between the drive pin of a floor truck and the drive member of a tow line comprising drive pin supporting means carried by the floor truck for mounting the drive pin for movement between a lower driving position in which the drive pin is engageable by a drive member and a higher driving position in which the drive pin is ordinarily not engageable by a drive member, a bumper, means mounting the bumper on the front of the truck for movement between an extended position and a retracted position, drive pin positioning means operable by movement of the bumper for holding the drive pin in the lower normal driving position thereof when the bumper is in its extended position and for permitting movement of the drive pin to the higher position thereof when the bumper is moved to its retracted position, and rise and drop sections provided in the tow line along which the spacing between a floor truck and the drive member is respectively reduced and increased, the drive member at the reduced spacing being engageable with the drive pin when in either of the lower and higher driving positions thereof, and the drive member at the increased spacing being engageable with the drive pin only when in the lower driving position thereof.

16. Drive pin position control mechanisms as claimed in claim 15 further comprising means resiliently urging the drive pin to said higher position.

17. Mechanism for controlling the relative position between the drive pin of a floor truck and the drive member of a tow line comprising:
    drive pin supporting means carried by the floor truck for mounting the drive pin for movement between a lower position in which the drive pin is engageable by a drive member and a higher position in which the drive pin is not engageable by a drive member,
    means urging the drive pin to said higher position,
    a bumper,
    means mounting the bumper on the front of the truck for movement between an extended position and a retracted position,
    a drive pin positioning member carried by the bumper,
    a cam surface on the positioning member,
    and follower means engaging the cam surface for holding the drive pin in the lower position thereof when the bumper is in its extended position and for permitting normally urged movement of the drive pin to the higher position thereof when the bumper is moved to its retracted position.

18. Drive pin position controlling mechanism as claimed in claim 17 wherein the drive pin supporting means includes a supporting housing, and pivot means connecting the supporting housing to the floor truck for pivotal movement on an axis extending transversely of the floor truck.

19. Drive pin position controlling mechanism as claimed in claim 18 wherein the follower means is carried by the supporting housing, and the cam surface on the positioning member is arranged to limit the extent of pivotal movement of the supporting housing from the lower to the higher position of the drive pin.

References Cited

UNITED STATES PATENTS

| 2,619,370 | 11/1952 | Leger | 293—8 |
| 2,640,580 | 6/1953 | De Burgh | 198—33 |
| 2,936,718 | 5/1960 | Bradt et al. | 104—172 |
| 3,015,284 | 1/1962 | Klamp | 104—172 |
| 3,045,610 | 7/1962 | Klamp | 104—172 X |
| 3,072,073 | 1/1963 | Peterson et al. | 104—172 |
| 3,103,895 | 9/1963 | Bradt et al. | 104—172 X |

FOREIGN PATENTS 612,793   11/1948   Great Britain.

ARTHUR L. LA POINT, *Primary Examiner.*

S. B. GREEN, D. F. WORTH III, *Assistant Examiners.*

UNITED STATES PATENT OFFICE
CERTIFICATE OF CORRECTION

Patent No. 3,357,367                              December 12, 1967

Walter C. Etheridge et al.

It is hereby certified that error appears in the above numbered patent requiring correction and that the said Letters Patent should read as corrected below.

Column 1, line 15, for "two" read -- tow --; column 6, line 38, for "extending" read -- extended --; column 7, line 5, for the claim reference numeral "9" read -- 8 --.

Signed and sealed this 28th day of January 1969.

(SEAL)
Attest:

Edward M. Fletcher, Jr.

Attesting Officer

EDWARD J. BRENNER

Commissioner of Patents